United States Patent [19]

Wildman

[11] E Re. 28,889

[45] Reissued July 6, 1976

[54] METHOD AND APPARATUS FOR ORTHODONTIC TREATMENT

[75] Inventor: Alexander J. Wildman, Eugene, Oreg.

[73] Assignee: Consyne Corporation, San Marcos, Calif.

[22] Filed: Feb. 24, 1972

[21] Appl. No.: 229,217

Related U.S. Patent Documents

Reissue of:

[64] Patent No.: 3,578,744
Issued: May 18, 1971
Appl. No.: 857,351
Filed: Sept. 12, 1969

[52] U.S. Cl. ..... 32/14 A
[51] Int. Cl.[2] ..... A61C 7/00
[58] Field of Search ..... 32/14 A

[56] References Cited

UNITED STATES PATENTS

| | | | |
|---|---|---|---|
| 1,976,115 | 10/1934 | Boyd et al | 32/14 |
| 2,671,964 | 3/1954 | Russell et al | 32/14 |
| 2,686,365 | 8/1954 | Schurter | 32/14 |
| 3,087,244 | 4/1963 | Huettner et al | 32/14 |

*Primary Examiner*—Robert Peshock
*Attorney, Agent, or Firm*—Jessup & Beecher

[57] ABSTRACT

After securement of brackets of novel design to teeth of a patient to be treated, impression is taken of the mouth. The impression is removed, replicas of brackets are inserted in impression and casting made of teeth which are then separated and positioned in ideal location in a model. Arch wires are then preformed to fit brackets on ideal model and after preforming, arch wire transferred to mouth of patient. Brackets have groove to receive arch wire which is locked in place by follower and snap ring.

17 Claims, 7 Drawing Figures

ALEXANDER J. WILDMAN
*INVENTOR*

*BY*
*BUCKHORN, BLORE, KLARQUIST & SPARKMAN*
*ATTORNEYS*

ALEXANDER J. WILDMAN
INVENTOR

BY
BUCKHORN, BLORE, KLARQUIST & SPARKMAN
ATTORNEYS

METHOD AND APPARATUS FOR ORTHODONTIC TREATMENT

Matter enclosed in heavy brackets [ ] appears in the original patent but forms no part of this reissue specification; matter printed in italics indicates the additions made by reissue.

BACKGROUND OF INVENTION

In accordance with what is known as the direct method of orthodontic work, bands are positioned around the individual teeth of a patient with brackets to permit connection of the bands to the arch wire and various spring wires as are ordinarily utilized. This technique requires considerable skill and judgment on the part of an orthodontist in manipulating and forming the various force applying wires so as to attain the desired movement of teeth.

In accordance with the so-called "indirect" method utilized heretofore, bands and arch wires are formed in an ideal model and then transferred to the patient. However, it is virtually impossible to secure the bands on the patient's teeth in the same location as on the model.

SUMMARY OF INVENTION

In accordance with the method of the invention and utilizing the apparatus of the invention, an orthodontist is enabled to perform the difficult and intricate task of forming an arch wire so as to obtain the desired tooth movement on an ideal model of the teeth of the patient while the arch wire is out of the mouth. Thereafter, the arch wire can be transferred to the patient's mouth and easily and quickly secured to the individual teeth by the novel brackets of the invention.

More particularly, in accordance with the method of the invention, arch wire brackets are secured by bands to the teeth of a patient after which an impression is made of the patient's mouth. After removal of the impression, replicas of the brackets are inserted in a corresponding position in the impression and a casting made of the teeth in the course of which the brackets will become rigidly attached to the tooth castings. Thereafter, the individual tooth castings are separated and reset in an ideal model of the patient's mouth whereupon an arch wire can be formed so as to conform to the bracket locations of the teeth in the ideal model. After formation of such wire, it is transferred to the patient's mouth, whereupon the memory of the wire will apply corrective force to the teeth causing them to move towards their ideal location.

THE DRAWINGS

Figure 1:
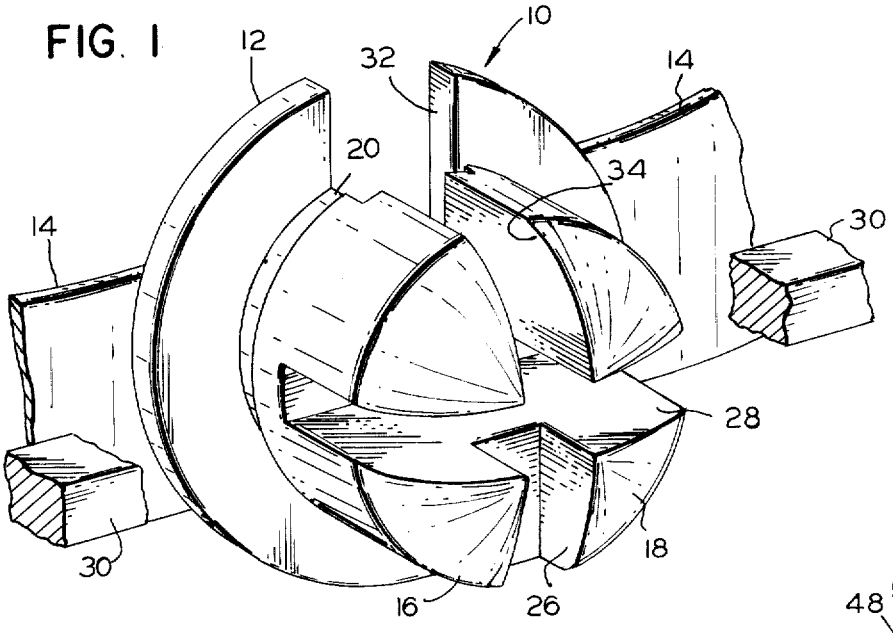
FIG. 1 is a perspective view of a portion of a bracket made in accordance with the invention.

Reference is made first to FIG. 1 in which is illustrated a bracket *body* 10 made in accordance with the invention and which bracket comprises a base portion 12 adapted to be secured as by brazing or other suitable means to a tooth band 14 which is mounted upon the patient's tooth in any conventional manner. The bracket also includes a head portion 16 having a labial surface 18. As indicated, the base and head portions are preferably of circular configuration, but need not be so, and extending between them is a shank 20 which is of reduced diameter with respect to both the base portion 10 and the head portion 16. The head portion 16 is formed with a horizontal groove 28 therein for receiving an arch wire 30. Preferably but not necessarily both the groove 28 and the arch wire 30 are of rectangular configuration. The head portion 16 is also provided with a vertical groove 26 which in depth may be less than the depth of the groove 28 but at least is of such depth that the difference between the depth of the groove 28 and the groove 26 is not greater than the thickness of the arch wire 39 the reason for which will become apparent.

A second vertical groove 32 is provided in the bracket, such vertical groove extending in the present embodiment through the base and shank portions and preferably being of rectangular cross section. Extending between the grooves 26, 32 is a notch 34.

Figure 2:
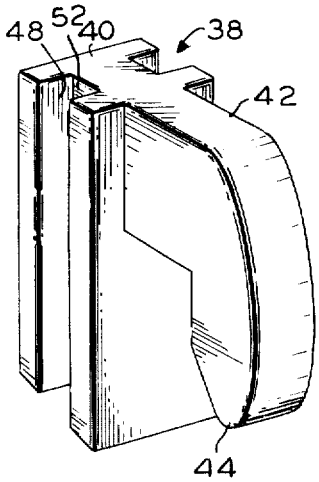
FIG. 2 is a perspective view of a so-called follower utilized in the bracket of the invention.

Referring now to FIG. 2, adapted to cooperate with the bracket 10 is a locking member or follower 38 which includes a base portion 40 of rectangular cross section adapted to be slidably received within the groove *or guideway* 32. Extending forwardly from the base portion 40 is an arm 42 adapted to be received in the notch 34 at the end of which arm is a locking *portion or* finger 44 adapted to extend forwardly of the arch wire 30 when the same is engaged within the groove 28, the lower end of the finger 44 being received within the lower portion of the groove 26.

Figure 3:
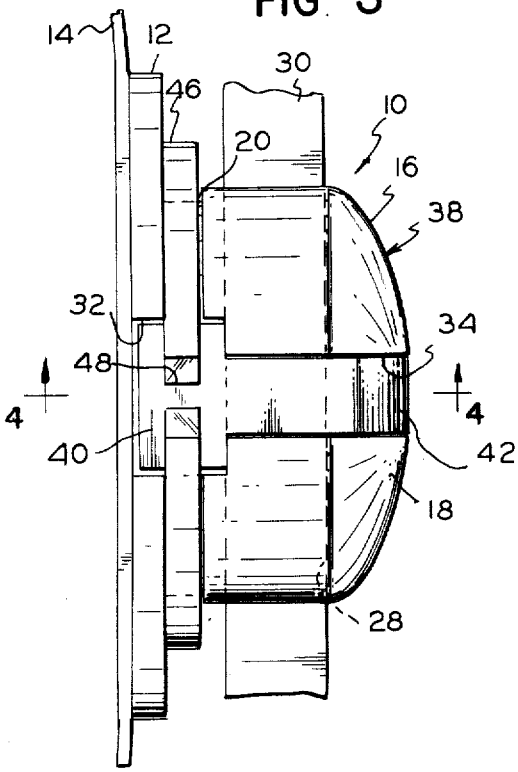
FIG. 3 is a top view of an assembled bracket.
Figure 4:
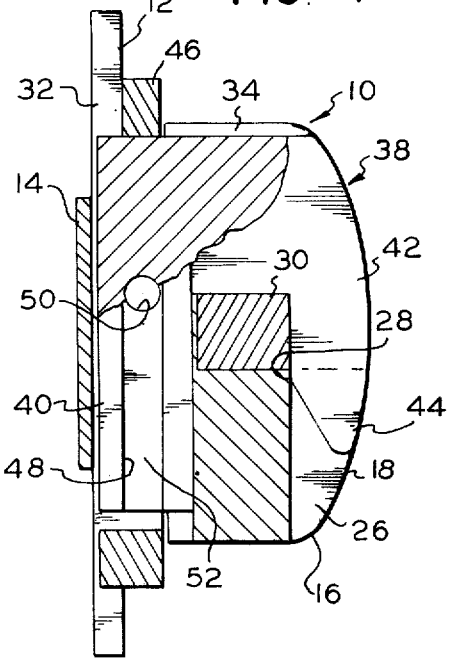
FIG. 4 is a sectional view taken along line 4—4 of FIG. 3.

The follower 38 is adapted to be *retained or* locked in place by a snap ring 46 which in turn is adapted to be engaged about the shank 20, the ends of the snap ring extending over the top *or shoulder* of the follower 38 when the follower is fully inserted, as may be seen in FIGS. 3 and 4. The follower base portion 40 is formed with grooves 48 in the opposite sides thereof in which the ends of the snap ring 46 are received during retraction or insertion of the follower. Preferably the follower 38 is provided with *first* means releasably to engage the snap ring in its *first* partially withdrawn *or open* position with the finger 44 clear of the groove 28. Such means may comprise an indentation 50 formed in one or both of the walls 52 of the grooves 48 as shown in FIG. 4, or other suitable stop means may be provided.

The bracket and follower are preferably formed of stainless steel or other suitable corrosion resistant, high strength metal and can obviously also be formed of high strength plastic or other material. The groove 26 and arch wire 30 are preferably of such dimension as to form a close fit, but they should, at the same time, permit some longitudinal movement of the arch wire 30 through the groove 28. Such movement is necessary, of course, to permit adjustment of the position of the bracket on the arch wire as a tooth rotates under pressure applied to it through the arch wire. Likewise, the clearance between the finger 44 and an arch wire 30 must be such as to permit sliding movement of the wire.

In accordance with the method of the invention, the brackets 10 and bands 14 are secured to the teeth of a patient. An impression of the patient's mouth is then taken so as to obtain an impression of the position of the teeth with the brackets attached thereto. The impression is removed from the mouth and replicas of brackets 10 are inserted in the corresponding apertures formed in the impression. Thereafter, a casting is made in the impression so as to obtain a model of the patient's teeth with the bracket replicas attached to the cast teeth. Next, the individual tooth castings are separated by cutting or other suitable means and reset in their ideal locations in a model. Next, an arch wire is formed so as to fit the brackets of the ideal model and upon its completion this arch wire is removed and attached to the brackets on the teeth in the patient's mouth. Upon attaching to the teeth in the patient's mouth, the memory of the wire will, of course, apply the desired pressure to the teeth in the mouth to cause them to rotate or tip or otherwise move as desired towards the ideal location. It may be preferred to start the treatment with a wire applying only a small amount of force and to increase the force applied as the treatment continues by changing the wire. In any case, the orthodontist can go back to his ideal model for forming the arch wire which is to positioned in the patient's mouth.

As will be clear from the foregoing, to attach the arch wire to the bracket the follower 38 is mounted on a bracket with the snap ring engaged in the openings 50 so that the groove 28 is clear. The arch wire 30 is then inserted within the groove 28 and positioned against the rear wall of such groove and pressure then applied to the follower 38 to cause it to move downwardly, thereby moving the finger 44 over the arch wire 30 to hold it in *its second or locked* position. When the follower 38 clears the ends of the snap ring 46, they will close over the top of the follower to retain it in *a closed* position.

To remove an arch wire the process is reversed, that is, the orthodontist opens the snap ring 46, for which purpose a suitable tool is provided. The follower 38 is then moved upwardly until the ends of the snap ring 46 engages in the indentations 50. At this point the finger 44 will have cleared the groove 28 so that the arch wire 30 can be moved sideways and out of the groove 28. While the bracket of this embodiment has been illustrated in connection with a rectangular arch wire 30, it will be obvious that round arch wires or bundles of two or more arch wires can be suitably utilized. Also, while the method of the invention has been described in connection with the brackets of FIGS. 1 to 4, it will be apparent it may also be performed with other types of brackets.

Figure 5:
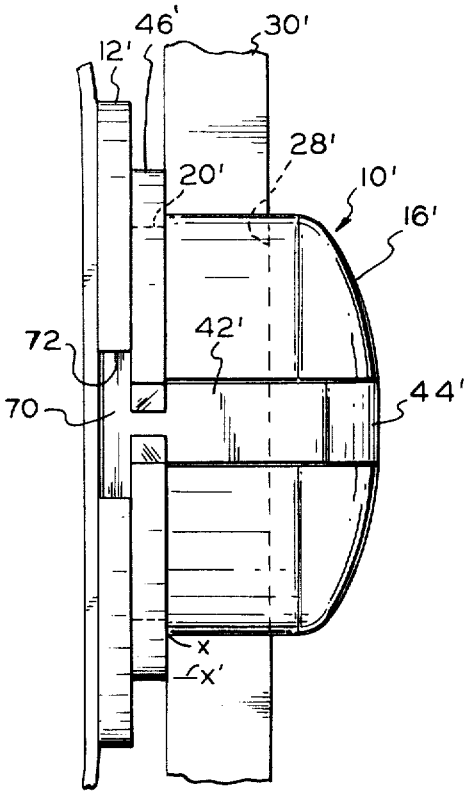
FIG. 5 is a top view of a modification of the bracket of the invention.

Referring to FIG. 5, a modification of a bracket of the invention is therein illustrated, the bracket 10' of this modification comprising a base portion 12' and a head portion 16', the horizontal groove 28' in this embodiment being of such depth as to extend to the shank 20'. Thus, the arch wire 30' abuts the surface of the snap ring 46'. The follower in this embodiment includes a base portion 70 fitting within a groove 72 formed in the base 12'. Extending from the base portion 70 is an arm 42'. The arm 42' is provided at its end with a finger 44' for engaging over the arch wire 30' when it is fully inserted. The present embodiment has the advantage over the prior described embodiment in that the length of arch wire contact is increased to the edge of the snap ring 46', that is, to the point X' compared to the point X thus increasing the torque arm for rotational inclination of a tooth.

Figure 6:
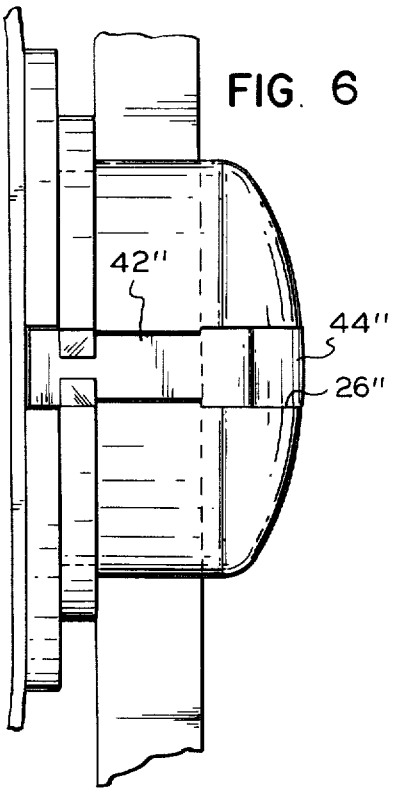
FIG. 6 is a top view of still another modification of a bracket made in accordance with the invention.

Referring to FIG. 6, in still another modification of the invention, the finger 44'' is of enlarged cross section relative to the arm 42'' and the vertical groove 26'' of the receiving bracket is correspondingly enlarged. This has the advantage of more securely holding the follower in place than in the previously described embodiments.

Figure 7:
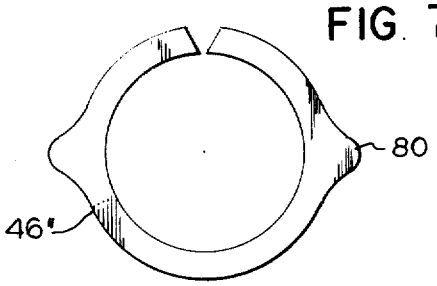
FIG. 7 is an elevation on reduced scale of a modification of a snap ring adapted for use in the invention.

To still further increase the rotational torque arm, the snap ring may be provided with wings 80 as shown in FIG. 7. Such wings can be provided on a snap ring as used in any of the foregoing embodiments.

Having described certain preferred embodiments it will be apparent that the invention permits of still other modifications in arrangement and detail.

I claim:

1. An orthodontic arch wire bracket for attachment to a tooth band and for connection to an arch wire means of predetermined thickness comprising:

a body member including a base portion having a base surface for attachment to a tooth band, a head portion having a labial surface, said head portion having a horizontal groove therein opening to said labial surface for receiving an arch wire, said groove having a depth greater than the said arch wire thickness, said head portion having a first vertical groove therein opening to said labial surface and having a depth relative to the depth of said horizontal groove by an amount substantially no less than said arch wire thickness, said base portion having a second vertical groove therein, said head portion having a notch therein extending between said first and second vertical grooves and opening to said labial surface of said head portion, a follower member comprising a base portion adapted slidably to engage within said second vertical groove, an arm portion adapted to be received within said notch, and a finger portion adapted to be received in said first vertical groove and to extend over an arch wire engaged within said horizontal groove, and lock means for releasably engaging said follower to prevent accidental removal of the same form from said body member.

2. A bracket as set forth in claim 1 wherein said body member comprises a shank portion between said base and head portions of reduced cross-sectional dimension relative to said base and head portions, said lock means comprising a snap ring adapted to be received about said shank.

3. A bracket as set forth in claim 2 wherein the bottom of said horizontal groove is spaced from said base portion by the thickness of said snap ring.

4. A bracket as set forth in claim 1 wherein said notch is of lesser width than said vertical grooves.

5. A bracket as set forth in claim 2 wherein said snap ring is formed with wings projecting horizontally therefrom.

6. A bracket as set forth in claim 2 wherein said follower member base portion is formed with indentations on each of its opposite sides for receiving the ends of said snap ring during insertion or demounting of said follower.

7. A bracket as set forth in claim 2 wherein said follower member is provided with means releasably to engage the ends of snap snap ring at a predetermined position of said follower member so as to retain said follower member in a partially demounted position.

8. A bracket as set forth in claim 2 wherein said snap ring is of a diameter greater than the horizontal extent of said head portion.

9. An orthodontic arch wire bracket for attachment to a tooth band and for connection to an arch wire comprising:

a body member including a base portion having a base surface for attachment to a tooth band, a head portion having a labial surface, and a shank portion positioned between said base and head portions and being of reduced cross-sectional dimension relative to said base and head portions, said head portion having a horizontal groove therein opening to said labial surface for receiving an arch wire, said head portion having a first vertical groove therein opening to said labial surface of the same depth as said horizontal groove, said base and shank portions having a second vertical groove therein, said head portion having a notch therein extending between said first and second vertical grooves and opening to the surface of said head portion, a follower member comprising a base portion adapted slidably to engage within said second vertical groove, an arm portion adapted to be received within said notch, and a finger portion adapted to be received in said first vertical groove and to extend over an arch wire engaged within said horizontal groove, and a snap ring adapted to be received about said shank and to engage said follower to prevent accidental removal of the same from said body member.

*10. In combination:*

*a body having a guideway and also being provided with an opening for receiving a member to be locked to the body,*

*the body also having a retaining portion adjacent the guideway,*

*a locking member having a slide portion slidable in the guideway and a locking portion movable between first and second positions relative to the body,*

*the locking member having a first snap ring engaging means and a second snap ring engaging means spaced from the first snap ring engaging means,*

*and a snap ring on the retaining portion having end portions adapted to engage the first snap ring engaging means and hold the locking member in said first position,*

*the end portions of the snap ring being separable to release the same from the first snap ring engaging means and also being adapted releasably to engage the second snap ring engaging means to hold the locking member in said second position.*

*11. In an orthodontic arch wire bracket,*

*a body having a base attachable to a tooth band and also including a head having a horizontal groove for receiving an arch wire and open at the side thereof more remote from the base,*

*the body having a guideway offset laterally from and extending at right angles to the groove,*

*a generally U-shaped follower having a slide arm slidable in the guideway and a locking portion extending across the open side of the groove when the follower is in a locking position thereof and clearing the open side of the groove when the follower is in an open position thereof,*

*and a snap ring on the body releasably holding the follower relative to the body selectively in either the locking position or the open position thereof,*

*the follower having shoulder portions engaged by the end portions of the snap ring when the follower is in the locking position thereof and also having recessed portions receiving the end portions of the snap ring member when the follower is in the open position thereof.*

*12. In an orthodontic arch wire bracket,*

*a body having a base attachable to a tooth band and also including a head having a horizontal groove for receiving an arch wire and open at the side thereof more remote from the body,*

*the base having a guideway extending at right angles to and offset laterally from the groove,*

*a generally U-shaped follower member having a slide arm fitting closely and slidably in the guideway between a closed position and an open position and also having a locking portion adapted to extend over an arch wire positioned in said groove when the follower is in the closed position thereof and clearing the groove when the follower is in the open position thereof,*

*and retaining means releasably holding the follower against movement relative to the body when in the closed position and releasable to permit the follower to be moved to the open position thereof and to hold the follower in the open position thereof.*

*13. In an orthodontic arch wire bracket for attachment to a tooth band and for connection to an arch wire,*

*a body including a base having a base surface for attachment to a tooth band and a head attached to the base,*

*the head having a horizontal arch wire receiving groove open at the side thereof more remote from the base,*

*the body also having a guideway extending at right angles to and laterally offset from the groove,*

*and a follower having a slide portion fitting closely and slidably in the guideway and also having a locking portion extending across the arch wire,*

*the follower being vertically slidable between a closed position in which the locking portion extends across the arch wire and an open position in which the locking portion clears the arch wire,*

*the follower and the end of the head being blended together and shaped to form a rounded, labial surface when the follower is in its closed position.*

*14. In an orthodontic arch wire bracket for attachment to a tooth band and for connection to an arch wire,*

*a body including a base having a base surface for attachment to a tooth band and a head attached to the base,*

*the head having a horizontal arch wire receiving groove opening away from the base and also having a notch,*

*the body also having a vertical guideway intersecting the notch,*

*and a follower having a slide portion fitting closely and slidably in the guideway, an arm portion fitting closely in and extending through the notch and a locking portion over the arch wire and blending with the head to form therewith a labial surface.*

*15. In an orthodontic arch wire bracket for attachment to a tooth band and for connection to an arch wire,*

*a body including a base having a base surface for attachment to a tooth band and a head attached to the base,*

*the head having a horizontal arch wire receiving groove open at the side thereof more remote from the base,*

*the body also having a guideway,*

*and a follower having a slide portion fitting slidably in the guideway between a closed position and an open position and also having a locking portion extending across the arch wire when the follower is in its closed position and clearing the arch wire receiving groove when the follower is in its open position,*

*an end portion of the locking portion being inclined to cam the arch wire into the groove when the follower is moved from its open position to its closed position.*

*16. In an orthodontic arch wire bracket for attachment to a tooth band and for connection to an arch wire,*

*a body including a base having a base surface for attachment to a tooth band and a head attached to the base,*

*the head having a horizontal arch wire receiving groove open at the side thereof more remote from the base,*

*the body also having a guideway,*

*a follower having a slide portion fitting slidably in the guideway and also having a locking portion extending across the arch wire,*

*the follower being slidable between a closed position in which the locking portion extends across the arch wire and an open position in which the locking portion clears the groove,*

*and a member on the body having outboard portions spaced beyond the ends of the groove for engaging the inner side of the arch wire and transmitting pivotal force from the arch wire to the body.*

*17. In an orthodontic arch wire bracket, body means attachable to a tooth and having a horizontal groove having an open side and a guideway extending transversely of and offset laterally from the groove;*

*a locking member having a locking portion and a slide portion slidable in the guideway between a closed position in which the locking portion closes the open side of the groove and an open position in which the locking portion opens the open side of the groove to permit an arch wire to be moved laterally into the groove;*

*and a generally C-shaped spring;*

*the body means having a portion entraping the spring;*

*the locking member having a pair of shoulder portions engaged by the end portions of the spring when in said closed position and held thereby in said closed position;*

*the locking member also having a pair of indentations engaged by the end portions of the spring when in said open position and held thereby in said open position.*

* * * * *